(12) United States Patent
Siroker et al.

(10) Patent No.: US 8,839,093 B1
(45) Date of Patent: Sep. 16, 2014

(54) SYSTEMS AND METHODS FOR WEBSITE OPTIMIZATION

(75) Inventors: Dan Siroker, San Francisco, CA (US); Pete Koomen, San Francisco, CA (US); Elliot Kim, San Francisco, CA (US); Eric Siroker, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 238 days.

(21) Appl. No.: 13/345,211

(22) Filed: Jan. 6, 2012

Related U.S. Application Data

(60) Provisional application No. 61/432,198, filed on Jan. 12, 2011, provisional application No. 61/496,183, filed on Jun. 13, 2011.

(51) Int. Cl.
*G06F 17/20* (2006.01)

(52) U.S. Cl.
USPC ............................................ 715/234

(58) Field of Classification Search
CPC ........................................ G06F 17/20
USPC ........................................ 715/234
See application file for complete search history.

(56) References Cited

U.S. PATENT DOCUMENTS

| | | | | |
|---|---|---|---|---|
| 2005/0229101 A1* | 10/2005 | Matveyenko et al. | ........ | 715/530 |
| 2008/0275980 A1* | 11/2008 | Hansen | .......................... | 709/224 |
| 2009/0030859 A1* | 1/2009 | Buchs et al. | ..................... | 706/19 |
| 2010/0037150 A1* | 2/2010 | Sawant | ......................... | 715/753 |
| 2010/0064281 A1* | 3/2010 | Kimball et al. | ............... | 717/124 |

* cited by examiner

*Primary Examiner* — Stephen Hong
*Assistant Examiner* — Tionna Burke
(74) *Attorney, Agent, or Firm* — Fenwick & West LLP

(57) ABSTRACT

Webpages are optimizing through the use of experiments that compare the responses of viewers that are either presented with the original webpage or a variant thereof. One or more variants are first defined through the use of a browser-based editor application that initially examines the webpage for a snippet of code. The snippet can be added to the webpage, if missing, and the webpage returned to the editor application. Changes made to the webpage to define a variant are saved in variation code. When the webpage is later requested by multiple viewers, in each instance the viewer receives the webpage with the snippet, the snippet instructs the browser to download a file, and the instructions of the file determine whether the viewer will see the variant or the original webpage. Tracking viewer responses to the webpage and the variant allow a statistical basis for comparison to be developed.

6 Claims, 6 Drawing Sheets

SYSTEMS AND METHODS FOR WEBSITE OPTIMIZATION

CROSS-REFERENCE TO RELATED APPLICATIONS

This application claims benefit and priority to U.S. Provisional Patent Application Ser. No. 61/432,198 filed Jan. 12, 2011 and also to U.S. Provisional Patent Application Ser. No. 61/496,183 filed Jun. 13, 2011, both entitled "Systems and Methods for Website Optimization" and both incorporated herein by reference.

BACKGROUND

1. Field of the Invention

The invention is in the field of webpage design and more specifically in the field of webpage optimization.

2. Related Art

Presently, it is relatively simple to create and publish a webpage on the World Wide Web (WWW). For some purposes, like providing a blog to publicize one's thoughts, the design of a webpage need only serve the tastes of the blogger. However, in other instances webpages are essential to the success of e-commerce and other online endeavors. Whether a potential customer will ultimately make a purchase or navigate away from a webpage depends in large measure on the initial impression that the webpage makes on the potential customer and how well the webpage then fills the needs of the potential customer by making goods or services easy to locate and obtain. It will be appreciated, of course, that these same considerations inform the webpage designs of many entities that are not necessarily seeking to sell anything, such as political and non-profit organizations. Thus, although one can put up a webpage in relatively short order and at little expense, designing a webpage that best serves the interests of an online organization or business can be quite challenging.

Traditionally, the design of webpages has been a matter of trial and error. A web designer creates a webpage, typically according to one's own sense of what works well, publishes the webpage by making the webpage available over the Internet, and waits to see what kind of response the webpage receives through metrics such as the number of views, the number of clicks, sales generated, and so forth. If the webpage is believed to be underperforming in view of these metrics, the web designer can implement changes and then see whether those changes improve or diminish the relevant metrics. A risk inherent in this procedure is that a poorly designed webpage will only be made worse through redesign. Another problem with this approach is that the relevant metrics may change for any number of reasons that are unrelated to the redesign of the webpage, and the respective weights cannot be discerned by simply observing the changes to the metrics. What is needed, therefore, is a means for testing the effectiveness of different designs for a webpage that is simple and quick to implement, that identifies improvements, and that limits the harm done by poor choices.

SUMMARY

The present invention provides methods for optimizing webpages through the use of experiments that compare the responses of viewers when presented with either the original webpage or a variant thereof. An exemplary method for establishing an experiment comprises receiving, with a first computing system such as server, a URL of the webpage to be the subject of the experiment. The exemplary method further comprises serving an editor application to a second computing system that will edit the webpage to create the variant, such as a personal computer. In the exemplary method a snippet of code is added to the webpage, such as to the first line of the webpage, and then the webpage with the snippet of code is served to the second computing system. The exemplary method further comprises receiving, with the first computing system, variation code defining a modification to the webpage. A variant of the webpage results from displaying the webpage with the modification made.

In various embodiments, the webpage is received by the first computing system after the editor application is served to the second computing system, and the snippet of code is added to the webpage by the first computing system. In other embodiments, where the webpage is served by a third computing system behind a firewall, for example, the snippet of code is added to the webpage by the third computing system before the editor application is served to the second computing system. In various embodiments the method further comprises storing the variation code is an experiment file. JavaScript can optionally used for the snippet, the editor application, the variation code, and/or the experiment file.

Another exemplary method of the invention is for optimizing a webpage and broadly encompasses establishing a variant and testing the variant against the original webpage. In this exemplary method a browser-based editor application is provided to a first computing system, such as a personal computer. The method then comprises receiving variation code from the first computing system, where the variation code specifies an element of the webpage and a modification to the webpage. The method additionally comprises storing the variation code in an experiment file, where the variation code is identified with the variant of the webpage. Lastly, the experiment file is repeatedly provided to second computing systems, for example multiple different personal computers, and then receiving from each second computing system that received the experiment file a tracking result in association with either the webpage or the variant. For instance, the tracking result can be whether the element was clicked by the viewer of the webpage or variant.

In various embodiments, further comprises comparing the tracking results for the webpage to the tracking results for the variant after the experiment file has been provided to multiple second computing systems. The exemplary method may additionally comprise, after providing the editor application, receiving a request made by the first computing system for the webpage, requesting the webpage from a third computing system, adding a snippet to the webpage, and serving the webpage with the snippet to the first computing system.

Another exemplary method for optimizing a webpage is performed by a person using a first computing system having a browser. In this method an editor application is run with the browser, where the editor application is configured to display an outer frame and an inner frame, and where the webpage is displayed in the inner frame. The method further comprises selecting an element of the webpage to modify and modifying the element to define a variant of the webpage. Selecting the element and modifying the element can be accomplished using standard graphical user interface tools such as clicking to select, grabbing corners to resize, dragging and dropping, and so forth. The exemplary method also comprises saving the variant, for example, by selecting a save button presented in the outer frame or by a keyboard command.

In various embodiments, the exemplary method further comprises switching the editor application from an editing mode to an interactive mode, interacting with the webpage in the interactive mode, then switching the editor application from the interactive mode back to the editing mode. The switching can be achieved, for example, with controls presented in the outer frame. When in the editing mode, the editor application prevents interaction with the elements of the webpage, but allows selection and modification of the elements.

Still another exemplary method of the present invention is directed to conducting an experiment. In this exemplary method a webpage is requested by a browser of a first computing system, the webpage is received from a second computing system, and then the browser builds a Document Object Model for the webpage. Building the DOM includes executing a snippet of the webpage, where the snippet requests an experiment file from a third computing system. Building the DOM further includes receiving the experiment file and executing the experiment file to modify an element of the DOM before the browser fires an event signifying that the DOM has been built and the page has finished loading. In this disclosure such an event is referred to as a DOMready event and the firing thereof is referred to herein as firing DOMready. In various embodiments executing the experiment file includes randomly selecting variation code within the experiment file, where the variation code specifies the element. In some of these embodiments executing the experiment file further includes determining that the element has not been loaded into the DOM, pausing until after the element has been loaded into the DOM, and then applying a modification specified by the variation code to the element in the DOM.

The present invention also provides a computer-readable medium having stored thereon a set of instructions. The computer-readable medium can be a storage device of a server, such as a magnetic disk, or a Random Access Memory (RAM) of a personal computer, for example. When executed, the set of instructions perform a method comprising displaying an inner frame within an outer frame of a browser window, displaying a webpage within the inner frame, receiving a user selection of an element of the webpage, and generating a unique selector for the element. In various embodiments, the method performed by the set of instructions generates the unique selector for the element as a line of code in JavaScript. Also, in various embodiments, the method performed by the set of instructions further comprises receiving a modification to the element, such as a change in dimension or placement within the webpage, and generating a line of code including the unique selector and a representation of the modification.

BRIEF DESCRIPTIONS OF THE DRAWINGS

Figure 4:
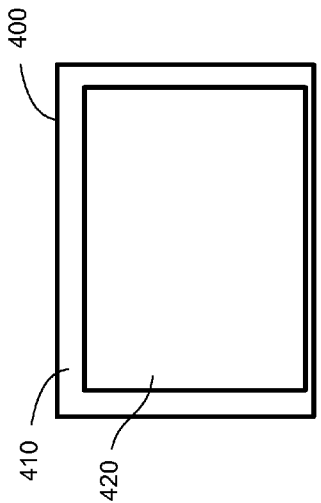

FIG. 4 provides an exemplary browser interface according to an exemplary embodiment of the present invention.

Figure 2:
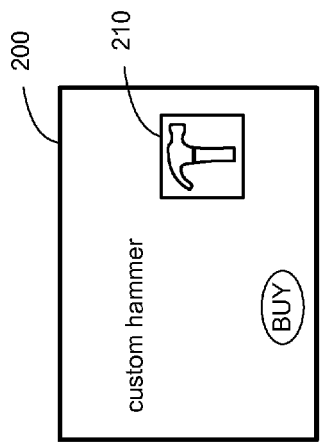
FIG. 2 represents an exemplary webpage that is subject to testing according to various embodiments of the present invention.
Figure 5:
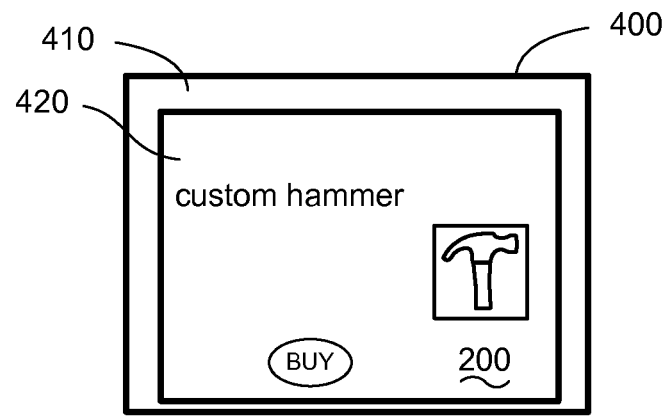

FIG. 5 represents the webpage of FIG. 2 displayed within the browser interface of FIG. 4.

Figure 6:
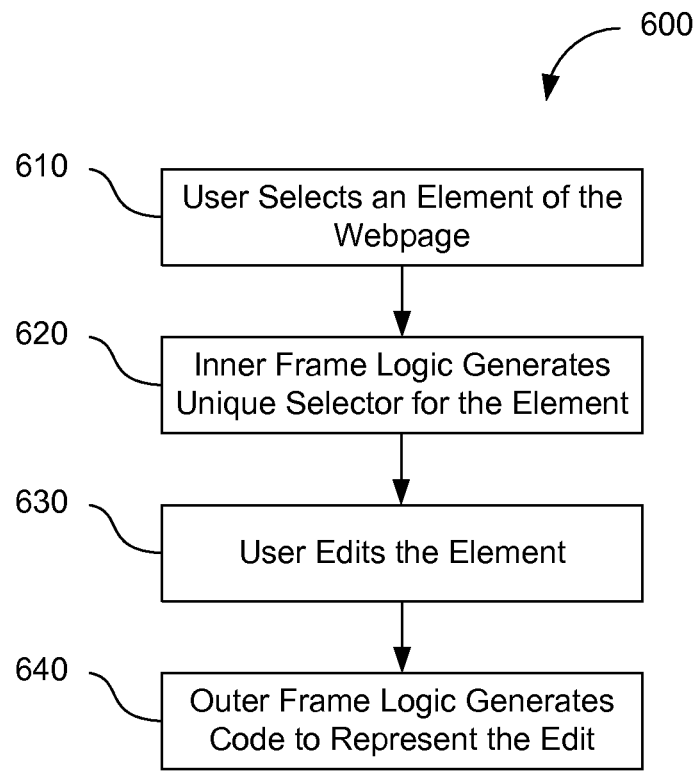

FIG. 6 is a flowchart representation of a method for creating a variant according to an exemplary embodiment of the present invention.

Figure 7:
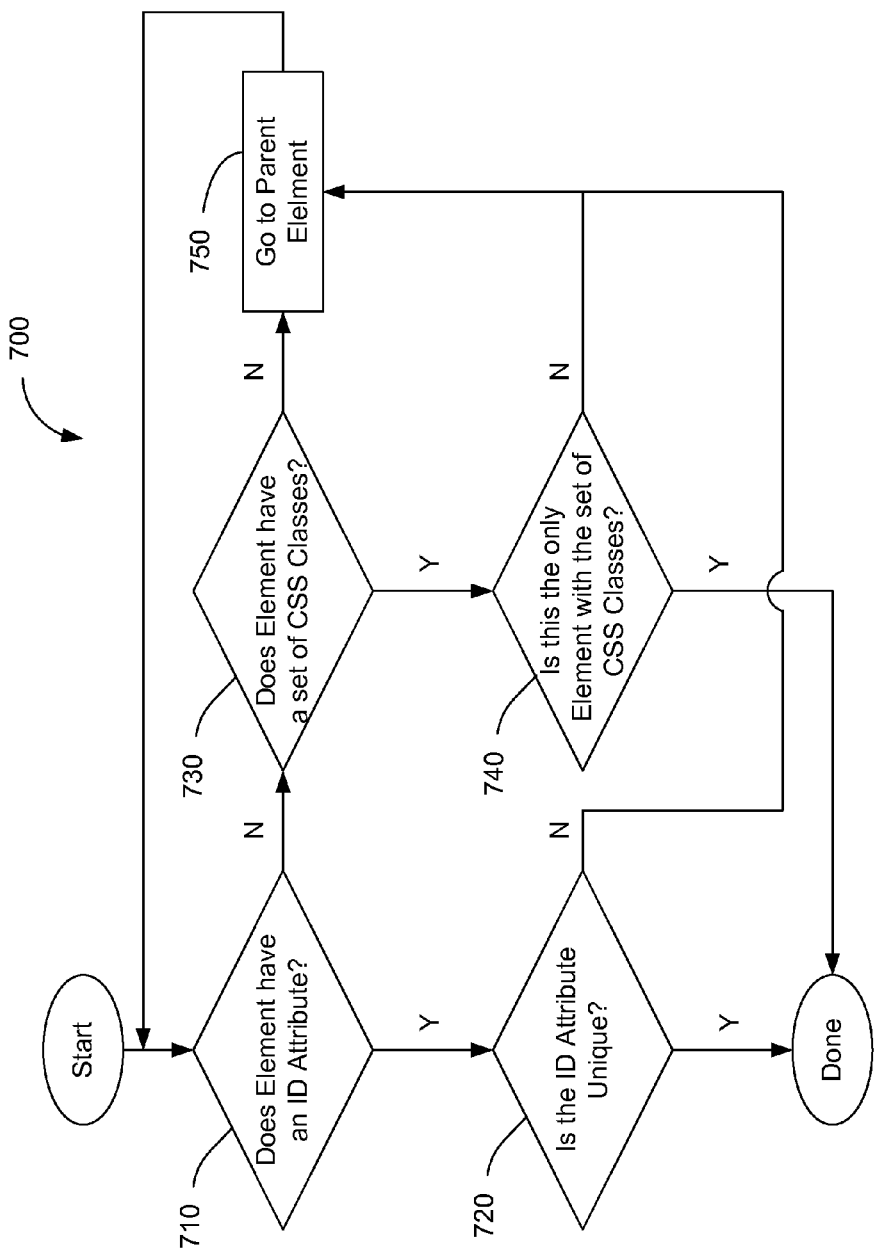

FIG. 7 is a flowchart representation of a method for determining a selector according to an exemplary embodiment of the present invention.

Figure 8:
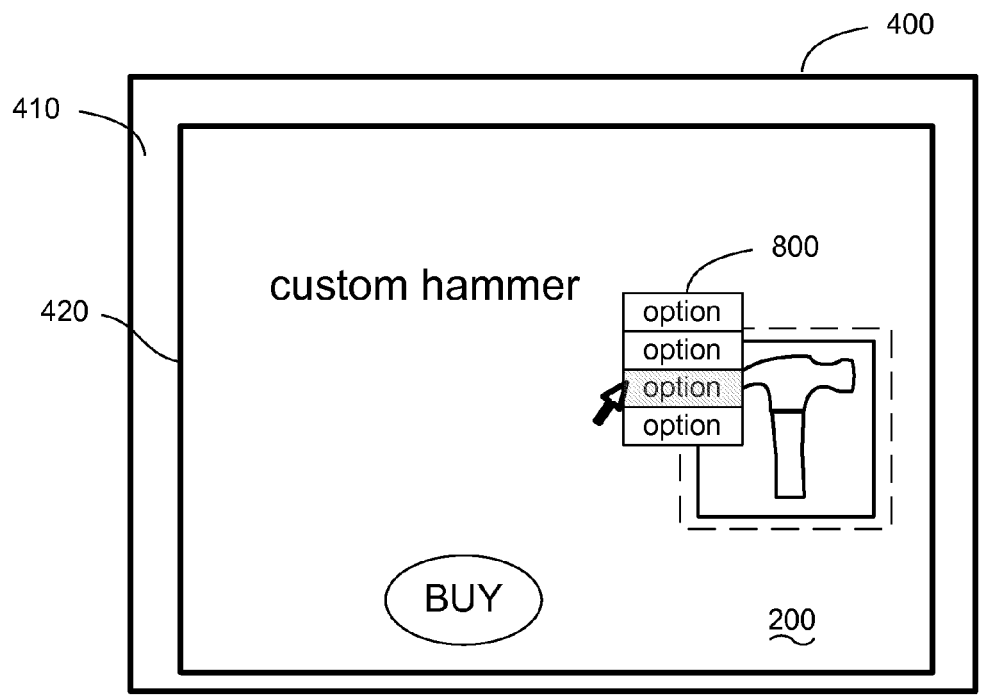

FIG. 8 represents the selection of an element of the webpage of FIG. 2 within the browser interface of FIG. 4.

Figure 9:
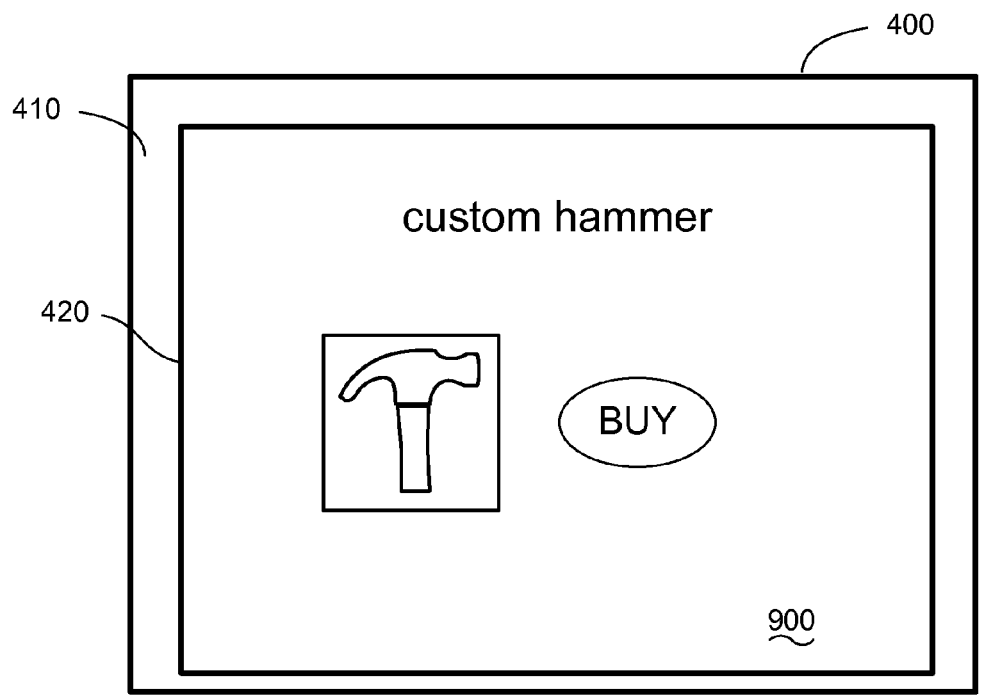

FIG. 9 represents a variant of the webpage of FIG. 2 displayed within the browser interface of FIG. 4.

Figure 10:
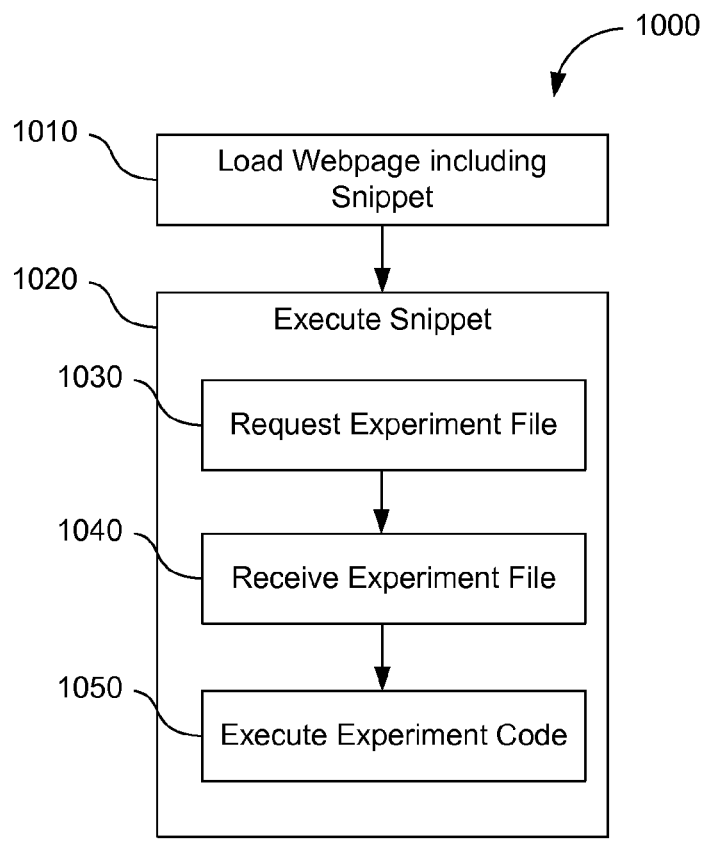

FIG. 10 is a flowchart representation of a method for running an instance of an experiment on a computing system according to an exemplary embodiment of the present invention.

Figure 11:
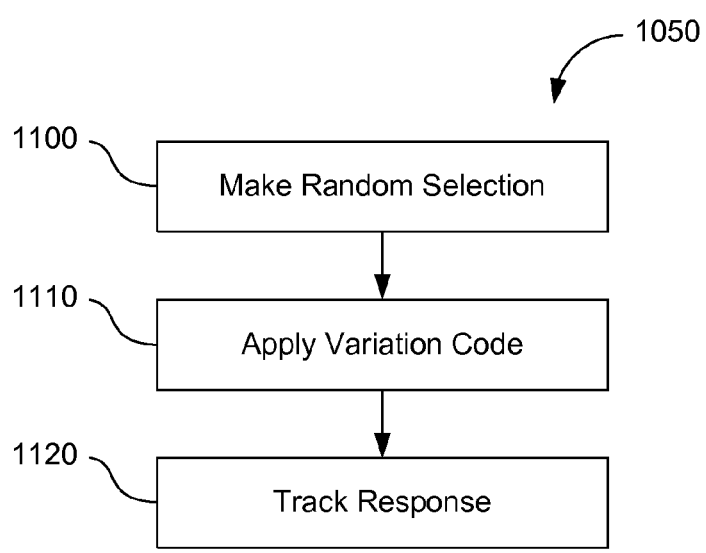

FIG. 11 is a flowchart representation of a method for performing the step of executing the experiment code of FIG. 10 according to an exemplary embodiment of the present invention.

DETAILED DESCRIPTION

The present invention provides systems and methods for conducting an experiment on a webpage toward the goal of optimizing the presentation thereof. A webpage that is the subject of such an experiment, when requested by a browser, will either appear as originally designed or will appear as some variant thereof. Each variant embodies one or more changes to the original webpage. During an experiment, interactions with the webpage are tracked, and over a span of time, through multiple viewings of the original webpage and its variants by multiple persons, statistics can be developed. From these statistics one can evaluate the variants relative to the original webpage, and to each other, to determine which changes improve the presentation and should be incorporated into the webpage.

In various embodiments the present invention provides an editor for creating variants of a webpage, and methods for editing the webpage to create the variants, and methods that subject webpages to experiments, through the addition of a short code, such as a Javascript code, to each webpage to be tested. The short code simply instructs the browser to fetch additional code from a third-party computing system each time the webpage is loaded. The additional code includes the specific changes that define each variant for an experiment, and instructions that will display either the original webpage or one of the variants. Whichever is displayed by the browser, the original or some variant, the selection is communicated back to the third-party computing system along with any information that the additional code includes instructions configured to track, such as whether the person viewing the webpage makes a purchase, how long the viewer views the page, and so forth.

The present invention also provides a browser-based editor application for creating the variants that will be used in experiments. The editor application can identify whether or not a webpage includes the short code, and if not, requests from the third-party computing system a mirrored copy of the webpage having the short code added thereto. When the browser executes that code after the webpage with the code has been returned, the code causes further code to be retrieved, and that code enables the editor application to fully function. In operation, the editor application disables the ability to interact with the elements of the webpage in the usual manner, such as by clicking through the user interface, and instead allows elements on the webpage to be modified, then records each modification, and communicates the set of changes for each defined variant back to the third-party computing system. Modifications to the webpage that define each variant are added to the code that is returned whenever the code added to the webpage is executed.

When the webpage having the added code is subsequently accessed by a browser that is not configured with the editor application, the code is again executed, and this calls the additional code, now configured with the modifications that define each variant. Additional code necessary to implement the experiment is also returned. This additional code instructs the browser to select a variant, or the original webpage, to present to the viewer. This additional code also reports the selection back to the third-party computing system, as well as any metrics that were determined.

Figure 1:
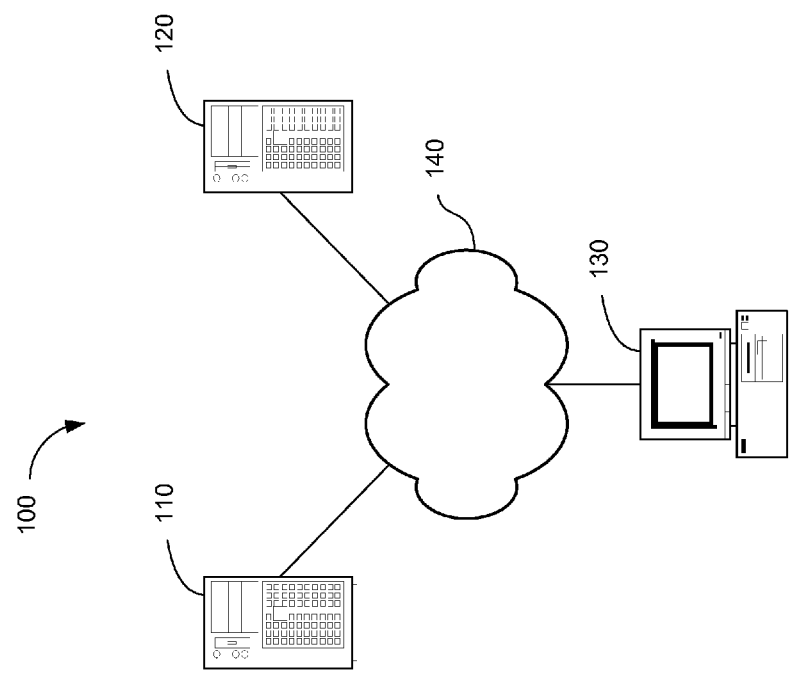
FIG. 1 illustrates an overview of an exemplary networked environment within which the present invention can operate.

FIG. 1 provides an overview of the networked environment 100 in which the present invention operates. The environment 100 includes a first computing system, also referred to herein as an experiment computing system 110 that performs functions in support of experiments such as providing editor applications, adding code to webpages, storing variants of webpages, and aggregating tracking metrics. Experiment computing system 110 is typically controlled by a third-party host that offers the opportunity to website owners to conduct experiments on webpages, to receive statistical analyses, and the like. Experiment computing system 110 can comprise, for example, one or more servers and databases networked together.

The environment 100 also comprises a second computing system, or client computing system 120. Like the experiment computing system 110, the client computing system 120 can comprise one or more servers and databases networked together. The client computing system 120 hosts a webpage identified by a Uniform Resource Locator (URL). The client computing system 120 may make the URL publically accessible over the Internet or may restrict access behind a firewall, for instance. Client computing system 120 is typically controlled by a different entity than the experiment computing system 110, for example, an online retailer or non-profit organization.

The environment 100 also comprises a third computing system, or customer computing system 130. Customer computing system 130 can comprise, for example, a personal computer (PC), tablet, or smart phone or any device that includes a display, a processor, a platform, and the ability to receive user input and to run a web browser to provide content to the display. The three computing systems 110, 120, 130 each are connected to a wide area network 140 such as the Internet. For the purposes of describing present invention, the customer computing system 130 in FIG. 1 will be understood to serve dual purposes. On one hand, the customer computing system 130 can be used to edit a webpage served by the client computing system 120. In these situations, the customer computing system 130 and the client computing system 120 are controlled by the same entity. The customer computing system 130 is also used herein to represent any computing system that requests a webpage that is the subject of an experiment.

FIG. 2 represents a webpage 200 as viewed in a web browser of the customer computing system 130. The webpage 200 includes a number of elements 210 that can comprise text, images, video, hyperlinks, radio buttons, and so forth. The webpage 200 can be either static or dynamic. As discussed in greater detail below, an experiment conducted on the webpage 200 will include creating a variant in which one or more elements 210 are added, deleted, resized, repositioned, given different attributes such as font, font size, or color, or similarly modified. Different variants of the same webpage 200 can be created and tested in parallel as part of the same experiment.

Figure 3:
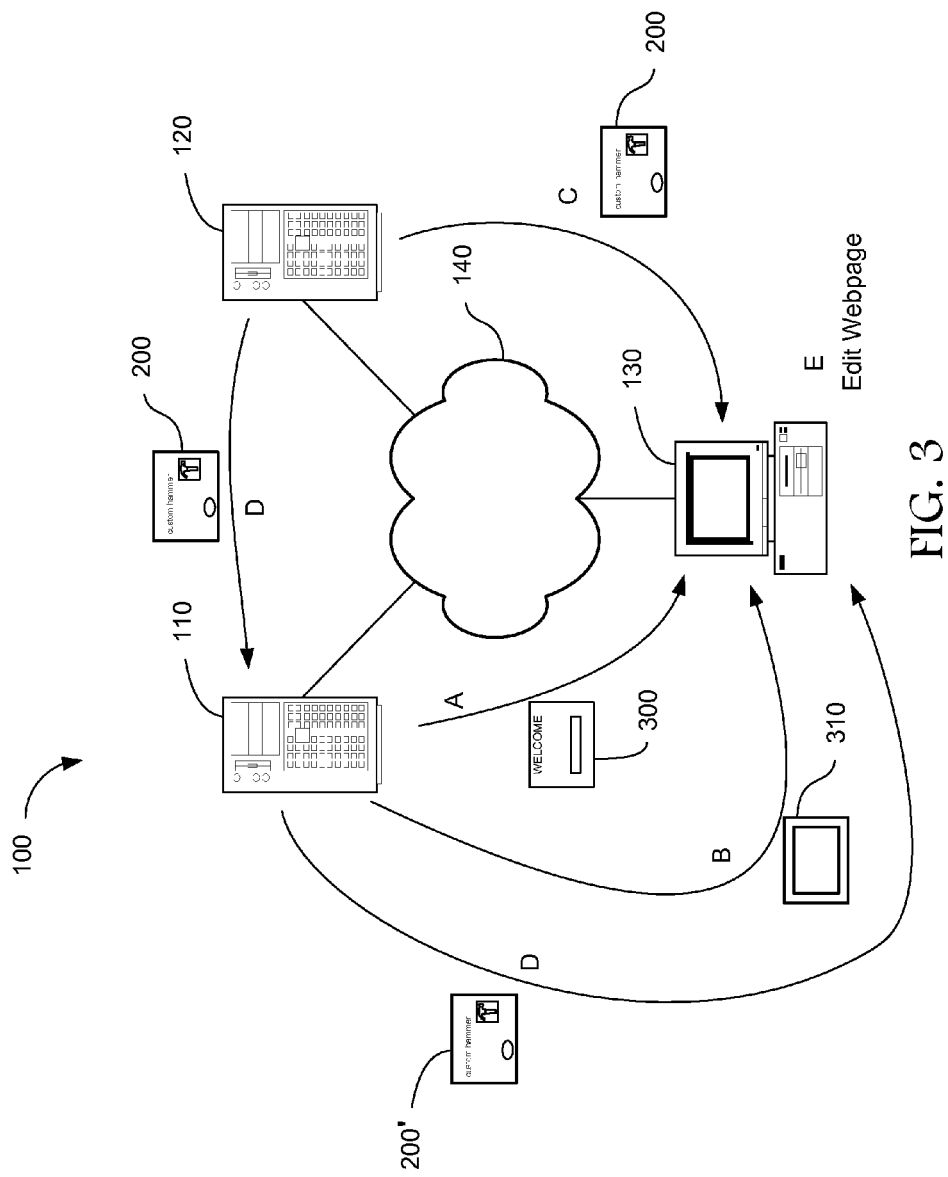
FIG. 3 represents a series of steps performed between computing systems according to exemplary methods of the present invention.

FIG. 3 illustrates an exemplary series of steps between the three computing systems 110, 120, 130 during the creation of a variant of a webpage 200. Initially, in a step A, the customer computing system 130 receives a webpage 300, such as a home page, from the experiment computing system 110. For instance, a browser running on the customer computing system 130 is directed to a URL for the webpage 300, causing the experiment computing system 110 to serve the webpage 300 to the customer computing system 130. The webpage 300 can include a text box, for example, for a user to specify the URL for the webpage 200 to be the subject of an experiment. The URL is then communicated to the experiment computing system 110 which recognizes the receipt of the URL as a request to edit the webpage 200.

Accordingly, in a step B, the experiment computing system 110 serves, and the customer computing system 130 receives, an editor application 310 which the browser of the customer computing system 130 displays to the user through an interface described below. The editor application can be in JavaScript, for example. The browser, when running the editor application 310, provides a user interface within which the user can view the webpage 200, select elements thereof, and modify those elements to create variants without necessarily editing HTML or creating a user account.

FIG. 4 shows an exemplary user interface 400 as displayed by the browser of the customer computing system 130, the user interface 400 comprising an outer frame 410 and an inner frame 420. As used herein, a frame refers to an HTML frame. In an exemplary step B, the browser of the customer computing system 130 loads the outer frame 410 first, where the outer frame 410 includes logic configured to create the inner frame 420 and to direct the inner frame 420 to the URL specified in step A for the webpage 200 for the experiment. HTML frames generally cannot communicate when the content within the frames are derived from different domains, unless both frames explicitly agree ("handshake").

Referring again to FIG. 3, in a step C the inner frame 420 receives the webpage 200 from the client computing system 120. Here, the outer frame 410 and the inner frame 420 are derived from different domains. Further, during step C, the logic of the outer frame 410 is configured to wait for a message from the inner frame 420 until a threshold is reached ("times out"), for example, after 5 seconds. If the message from the inner frame 420 is received (the handshake occurs), the webpage 200 has previously been configured with added code, discussed in more detail below, and the logic of the outer frame 410 proceeds to step E. The lack of a handshake indicates that the webpage 200 has not been previously configured, in which case the logic of the outer frame 410 is configured to remove the inner frame 420 and create a new inner frame 420 directed to a URL on the same domain as the outer frame 410. For example, the new URL can be a mirrored URL of the format edit.example.com/URL.

In a step D, again illustrated by FIG. 3, the experiment computing system 110 receives a request from the inner frame 420 for the mirrored URL, requests and receives the webpage 200 from the client computing system 120, adds a short piece of code to the webpage 200, and serves the modified webpage 200, designated in FIG. 3 as webpage 200', to the inner frame 420. The short piece of code will be referred to herein as a snippet and in various embodiments is written in JavaScript. The snippet is added to the beginning of the code that defines the webpage 200, for example, as the first line of that code. An exemplary snippet has the format:

<script src="//cdn.example.com/js/ID.js"> </script> where the ID is a unique identifier assigned to a particular entity conducting one or more experiments. The same entity may have multiple IDs, and the experiment file associated with a particular ID can include experiments for more than one webpage 200. In some embodiments, a snippet includes no more than 65 characters. Each time a browser loads a webpage 200' that includes such a snippet, the snippet is executed, causing the browser to request an experiment file http://cdn.example.com/js/ID.js from cdn.example.com. The experiment file will be expanded through the addition of variation code in the editing process described below, but initially includes instructions that permit the inner frame 420 to send a message to the outer frame 410 to complete the handshake. It is noted that a content delivery network (CDN) can be employed to accelerate delivery of the experiment file, but is not required by the invention.

As provided above, the webpage 200 can be pre-configured so that the handshake is made in step C. For example, the owner of the client computing system 120, having one or more preassigned unique IDs, can have the snippet of code manually added to the webpage 200 to create webpage 200' prior to step A. Such pre-configuration can be useful where the webpage 200 is behind a firewall or authentication wall, and therefore would not be accessible to the experiment computing system 110 in step D. Thus, in these instances, webpage 200' is served to the inner frame 420 in step C, the snippet is executed, the inner frame 420 receives and runs the experiment file, sends the message to the outer frame 410, and the logic of the outer frame 410 then proceeds to step E.

In a step E the webpage 200' is edited by the user of the customer computing system 130 using editing tools made available by the logic of the outer frame 410. FIG. 5 illustrates the webpage 200' as displayed within the inner frame 420 of the user interface 400 during step E. FIG. 6 illustrates an exemplary method 600 of creating a variant of the webpage 200 in step E. In a step 610 the user employs the user interface 400 to select an element 210 of the webpage 200. To allow the user to make this selection, the logic of the outer frame 410 disables the logic of the inner frame 420 that would otherwise allow the user to interact with the webpage 200. Thus, in FIG. 5, for example, the user can no longer select the BUY button to be redirected to another webpage. Rather, the logic of the outer frame 410 is configured to highlight selectable elements 210 of the webpage 200, such as with an outline, when a cursor is moved over, or close to, such selectable elements 210. It will be appreciated that FIG. 5 is an oversimplification showing only three separate elements 210, but in a typical webpage 200 there are often complex hierarchies of such elements 210 involving nesting, for example. The logic of the outer frame 410 is configured to allow the user to select elements 210 at any level within such a hierarchy.

When a user makes a selection of an element 210 in step 610, then in a step 620 the logic of the inner frame 420 is configured to assign to element 210 a string that can be used to uniquely identify this element among all others on the webpage 200'. This string will henceforth be referred to as a "selector" for element 210. The logic of the outer frame 410 can be configured to make the determination using a JavaScript library such as jQuery, for instance. FIG. 7 illustrates an exemplary method 700 for assigning a selector to an element 210 of a webpage 200. In a step 710, the logic of the outer frame 410 is configured to determine whether the element 210 has an ID attribute. If so, in a step 720 the logic determines whether the ID attribute is unique within the webpage 200, and if yes, the method 700 is done and the ID attribute becomes the selector.

If the element 210 does not have an ID attribute in step 710, then the logic of the outer frame 410 is configured to determine whether the element 210 has a set of Cascading Style Sheet (CSS) classes in a step 730. If so, in a step 740 the logic determines whether the element 210 is the only element with that set of CSS classes, and if so, the set of CSS class names is chosen as the selector for element 210 and the method 700 is done. If, in any of the steps 720, 730, or 740 the result is no, then the method 700 goes to a step 750 where the parent element 210 is selected and the method returns to step 710. As soon one element 210 in the ancestor chain of the selected element 210 is uniquely identified the selector becomes a string that defines the selected element 210 in terms of its relationship to the uniquely identified element 210, such as "3rd image child of 4th paragraph child of unique_element."

Returning to FIG. 6, once an element 210 is selected and has a selector, the user can employ the user interface 400 to modify the element 210 in a step 630. FIG. 8 illustrates step 630. Here, the user selects an element 210 on the webpage 200 and the logic of the outer frame 410 is configured to highlight the selected element 210 and bring up a menu 800 of options appropriate for the selected element 210. Exemplary options allow the user to modify or remove elements 210 through typical GUI operations such as dragging and dropping. Other exemplary options allow the user to bring up a dialog box within which the user can edit the HTML or JavaScript directly. Still other options allow the user to add elements 210 not already on the webpage 200. It is noted that method 600 does not require the user to edit HTML, though the option exists in some embodiments. Additionally, the user is not required to create an account to perform method 600.

The editor application can make additional tools available to the user for generating statistics when an experiment is running. As an example, the user can establish various metrics to track such as the number of clicks on an element 210. In various embodiments the outer frame 410 provides such tools, for example.

FIG. 9 shows a variant 900 of the webpage 200 resulting from the rearrangement of elements 210. In a step 640, for each modification to an element 210 of the original webpage 200 the logic of the outer frame 410 stores a line of code, such as JavaScript code, that specifies the selector in association with the modification made to the element 210. When the user is done making modifications, indicated by executing a save command, for example, all of the lines of code specifying changes (collectively referred to herein as the variation code) are communicated back to the experiment computing system 110 where the variation code is stored in a new version of the experiment file. For each variant 900 of the webpage 200 that is defined, another variation code is stored in the experiment file. In some embodiments the outer frame 410 includes tabs, for example, so that the user can switch between the original webpage 200 and any of the variants 900 that have been defined. It will be appreciated, therefore, that the user can design and preview any variant 900 of the original webpage 200 without actually having to make changes to the HTML of the webpage 200.

The discussion above treats elements 210 as static, but many webpages 200 include interactive elements 210, simple examples including modal dialogs and dropdown menus. In some embodiments, therefore, the logic of the outer frame 410 is configured to allow the user to switch between an editing mode in which the logic of the outer frame 410 prevents the user from interacting with webpage 200, and an interactive mode in which the logic of the outer frame 410 allows interaction with the webpage 200 but does not provide editing functions. Switching between modes can be accomplished through controls presented in the outer frame 410, for example.

In various embodiments, when a variant 900 has been partially created, and a user switches from the editing mode to the interactive mode, the logic of the outer frame 410 resets the webpage 200 within the inner frame 420 by redisplaying the cached copy and allows the user to interact with the webpage 200. When the user returns to the editing mode, the logic of the outer frame 410 clones the Document Object Model (DOM) as it exists at that time, modifies the DOM according to the existing variation code, and then allows the user to continue editing.

As noted above, statistics are developed over some length of time by serving the webpage 200' including the snippet multiple times to different customer computing systems 130. Each time the webpage 200' is served to a customer computing system 130 while an experiment is being conducted will be referred to herein as an instance of the experiment. FIG. 10 illustrates an exemplary method 1000 for conducting an instance of an experiment. The method 1000 is performed by each customer computing system 130 that is served the webpage 200'.

Initially, the browser of a customer computing system 130 requests the webpage 200' from the client computing system 120. Persons requesting the webpage 200' do not generally have any reason to know that they will be viewing either the original webpage 200 or a variant 900 thereof within the context of an experiment. In a step 1010 the webpage 200', including the snippet, is loaded by the browser of the customer computing system 130. Since the snippet is in the beginning of the code that specifies the webpage 200', such as the first line, as the browser starts to parse the webpage 200' the snippet is quickly encountered and in a step 1020 the snippet is executed.

Executing the snippet in step 1020 comprises the step 1030 of requesting an experiment file from the experiment computing system 110, the step 1040 of receiving the experiment file, and the step 1050 of executing the experiment code. It is noted that the experiment file includes both the editing code that enables the editing process by allowing the inner frame 420 to communicate with the outer frame 410, as noted above, the experiment code that includes the variation code for each defined variant 900, as well as the additional code for performing other necessary tracking functions.

As shown in FIG. 11, the step 1050 of running the experiment code, in turn, comprises the step 1100 of making a random selection between the options of either no variation code or one of the variation codes provided in the experiment code. In some embodiments these options are weighted equally, while in other embodiments the experiment can be configured such that the original webpage 200 or any variant is selected more or less frequently. In this way, for example, an experiment can be configured such that 80% of the time the original webpage 200 will be presented and only 20% of the time one of the variants 900 will be presented.

In those instances in which a variant 900 has been randomly selected, then in step 1110 the experiment code is configured to then apply the modifications specified by the corresponding variation code. Running the experiment code thus further comprises displaying the variant 900, and in some embodiments displaying the variant 900 includes executing the variation code before the browser fires DOMready, an event that occurs when the HTML is loaded, but potentially before other assets such as images have loaded. For example, the experiment code can be configured to look to the first element 210, specified by the variation code by its selector, and determine whether that element 210 has already been loaded into the browser's DOM. If not, the experiment code waits briefly while the webpage 200' loads and elements 210 continue to load into the DOM, pausing for 50 ms, for example, before checking again.

Once it is determined that the element 210 specified by the variation code has been loaded, the modification specified for the element 210 is applied to that element 210. This is repeated for every element 210 specified by the variation code and then the execution of the variation code is complete. Sometime thereafter, DOMready fires. In some instances, while the experiment code is going through the process of identifying elements 210 and applying the appropriate modifications, the experiment code may encounter a line of code that does not fit this format (e.g., the line of code may have been written and inserted directly by the webpage owner). The experiment code can be configured to suspend execution and wait until DOMready fires, and only then complete the process of applying modifications to elements 210 specified by the variation code.

Other code specified by the experiment file may execute after DOMready in step 1120 to track the response of the viewer to the variant 900. For example, experiment code can be configured to track clicks on various elements 210, whether modified or not. It will be appreciated that in those instances where the original webpage 200 is selected randomly, there is no variation code to apply in step 1110, but step 1120 is still performed. In either situation, the experiment code uploads the results of steps 1100 and 1120 to the experiment computing system 110. The experiment computing system 110 is configured to aggregate the results received for each experiment file, referred to herein as "tracking results," as a function of what the viewer was presented, the original webpage 200 or variant 900.

Computing systems referred to herein can comprise a microprocessor, a personal computer, a server, a distributed computing system, a communication device, a network device, or the like, and various combinations of the same. A computing system may also comprise one or more computer-readable media including volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing digital information, such as in a database. A computing system, as used herein, expressly requires at least some of the hardware noted above and expressly excludes pure software. The various examples of logic noted above can comprise hardware, firmware, or software ("code") stored on a computer-readable medium, or combinations thereof. A computer-readable medium, as used herein, expressly excludes paper and carrier waves. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. A method comprising:
   requesting a webpage with a browser of a first computing system;
   receiving the webpage from a second computing system;
   building a document object model (DOM) for the webpage, including
   executing a snippet of the webpage that requests an experiment file from a third computing system,
   receiving the experiment file which stores variation code specifying an element of the DOM and a modification thereto, and executing the experiment file to modify the element of the DOM before the browser fires DOMready, wherein executing the experiment file comprises:
    determining that the element has not been loaded into the DOM,
    pausing until after the element has been loaded into the DOM, and
    applying the modification specified by the variation code to the element in the DOM.

2. The method of claim 1, wherein executing the experiment file further includes randomly selecting variation code within the experiment file, the variation code specifying the element.

3. A computer program product comprising a non-transitory computer-readable storage medium storing executable instructions, the instructions when executed performs steps comprising:
    requesting a webpage with a browser of a first computing system;
    receiving the webpage from a second computing system;
    building a document object model (DOM) for the webpage, including
    executing a snippet of the webpage that requests an experiment file from a third computing system,
    receiving the experiment file which stores variation code specifying an element of the DOM and a modification thereto, and
    executing the experiment file to modify the element of the DOM before the browser fires DOMready, wherein executing the experiment file comprises:
        determining that the element has not been loaded into the DOM,
        pausing until after the element has been loaded into the DOM, and
        applying the modification specified by the variation code to the element in the DOM.

4. The computer program product of claim 3, wherein executing the experiment file further includes randomly selecting variation code within the experiment file, the variation code specifying the element.

5. A computer system comprising:
    at least one computer processor; and
    a non-transitory computer-readable storage medium storing executable instructions,
        the instructions when executed by the computer processor perform steps comprising:
        requesting a webpage with a browser of a first computing system;
        receiving the webpage from a second computing system;
        building a document object model (DOM) for the webpage, including
        executing a snippet of the webpage that requests an experiment file from a third computing system,
        receiving the experiment file which stores variation code specifying an element of the DOM and a modification thereto, and
        executing the experiment file to modify the element of the DOM before the browser fires DOMready, wherein executing the experiment file comprises:
            determining that the element has not been loaded into the DOM,
            pausing until after the element has been loaded into the DOM, and
            applying the modification specified by the variation code to the element in the DOM.

6. The computer system of claim 5, wherein executing the experiment file further includes randomly selecting variation code within the experiment file, the variation code specifying the element.

* * * * *